US012789120B2

(12) United States Patent
Conroy et al.

(10) Patent No.: US 12,789,120 B2
(45) Date of Patent: Nov. 10, 2026

(54) WASTEWATER TREATMENT SYSTEM

(71) Applicant: Hydro-Dyne Engineering, Inc., Clearwater, FL (US)

(72) Inventors: Jay R. Conroy, Clearwater, FL (US); Timothy F. Matheis, Palmetto, FL (US); Samuel C. Sturtevant, Tampa, FL (US)

(73) Assignee: Hydro-Dyne Engineering, Inc., Clearwater, FL (US)

( * ) Notice: Subject to any disclaimer, the term of this patent is extended or adjusted under 35 U.S.C. 154(b) by 437 days.

(21) Appl. No.: 18/483,596

(22) Filed: Oct. 10, 2023

(65) Prior Publication Data

US 2024/0115976 A1 Apr. 11, 2024

Related U.S. Application Data

(60) Provisional application No. 63/378,705, filed on Oct. 7, 2022.

(51) Int. Cl.
*B01D 21/00* (2006.01)
*B01D 21/24* (2006.01)

(52) U.S. Cl.
CPC ..... *B01D 21/0042* (2013.01); *B01D 21/0003* (2013.01); *B01D 21/0012* (2013.01); *B01D 21/2433* (2013.01); *B01D 21/2466* (2013.01)

(58) Field of Classification Search
CPC ............ B01D 21/0042; B01D 21/0012; B01D 21/2433; B01D 21/0003; B01D 21/2466
See application file for complete search history.

(56) References Cited

U.S. PATENT DOCUMENTS 6,505,743 B1 * 1/2003 Bandis ............... B01D 21/0012 209/464
6,551,508 B1 * 4/2003 Bovington ......... B01D 35/0276 210/256
7,285,211 B2 * 10/2007 Brody .................. B01D 21/003 210/411
7,824,549 B2 * 11/2010 Wilcher ............. B01D 21/0033 210/519
9,908,067 B2 * 3/2018 Wright ............... B01D 21/2433
(Continued)

FOREIGN PATENT DOCUMENTS

WO WO-2021217213 A1 * 11/2021 ................ E03F 5/14

*Primary Examiner* — Youngsul Jeong
(74) *Attorney, Agent, or Firm* — Johnson & Martin, P.A.; James David Johnson

(57) ABSTRACT

Waste water treatment systems and methods are described that remove screenings, objects, and grit from waste water. The system includes a tank for receiving unfiltered waste water from an inlet and a flow screen installed in the tank to capture screenings that are objects too large to pass through the flow screen. A washing compactor ejects the screenings out of the system. Filtered water containing grit passes through the flow screen and under a velocity-diffusing baffle surrounding the flow screen into the tank to produce a grit slurry. A pump removes the grit slurry from the tank through piping to a dewatering device, and the dewatering device removes water from the grit slurry to produce dewatered grit. Filtered waste water and objects are transmitted out of the tank via an outlet after it flows over an overflow weir installed around an interior surface of a wall of the tank.

19 Claims, 10 Drawing Sheets

(56) References Cited

U.S. PATENT DOCUMENTS

| | | | | |
|---|---|---|---|---|
| 10,786,760 | B2 * | 9/2020 | Anastasio .......... | B01D 21/0042 |
| 2015/0183660 | A1 * | 7/2015 | Wright ............... | B01D 21/2433<br>210/801 |

* cited by examiner

WASTEWATER TREATMENT SYSTEM

This application is a nonprovisional application of and claims priority from U.S. provisional patent application Ser. No. 63/378,705 filed on Oct. 7, 2022. The foregoing applications are incorporated in their entirety herein by reference.

FIELD OF THE INVENTION

The invention relates to waste water treatment. More particularly, the invention relates to systems and methods for treating waste water by screening and grit removal.

BACKGROUND

Waste water treatment systems are often large, having multiple components interconnected that occupy a significant amount of floor or ground space. Conventional waste water treatment systems may contain multiple inlets, multiple outlets, or both to connect their various components to a tank. Such conventional systems often utilize concrete clarifying tanks that are made by concrete forming onsite. When the tanks of such systems are constructed from concrete, the time and cost necessary to create the tank by concrete forming to create multiple inlets and outlets renders them less desirable from a manufacturing perspective.

Traditional waste water treatment systems often are not as effective as desired in removing screenings, grit, sediment, and other debris from waste water. In addition, conventional waste water treatment systems often must be removed from service during maintenance, particularly for maintenance, repair, or replacement of flow screens.

A need exists for waste water treatment systems that have a compact footprint when installed on a floor or ground. A need also exists for waste water treatment systems having tanks that are not made from concrete and that are manufacturable offsite so that the expense and time required for concrete forming onsite is unnecessary. A further need exists for waste water treatment systems and methods that are more efficient in removing screenings, grit, sediment, and other debris from waste water during waste water treatment. Still a further need exists for waste water treatment systems that permit continued operation while flow screens are undergoing maintenance, repair, or replacement.

SUMMARY

The invention relates to waste water treatment systems and methods to remove suspended materials from waste water. Suspended materials include both small and large particles that can be carried by the water column including items like fibers, paper scrap, food waste, sand, shell and bone grounds, all of variable density. The system includes a tank for receiving unfiltered waste water from an inlet and a flow screen installed in or above the tank (e.g., centrally in or above the tank) to capture screenings (also referred to herein as "screened material"), which are too large to pass through openings of the flow screen. The inlet is connected to a plenum that diffuses flow velocity and distributes a flow of the unfiltered waste water into the flow screen. The flow screen receives unfiltered waste water from the inlet, and captures or filters the screened material for ejection out of the system. A washing compactor connected to the flow screen ejects the screenings out of the system, e.g., into a waste bin.

The waste water treatment system includes a velocity-diffusing baffle installed in the tank at least partially beneath the water surface around a bottom portion of the flow screen that is submerged in the water within the tank. The velocity-diffusing baffle might also be referred to as a grit diffuser weir or diffusion weir because it serves to diffuse or reduce the velocity of grit contained in filtered waste water exiting the flow screen so that the grit is directed radially downward toward the bottom of the tank to settle in or on an interior bottom end (or interior bottom surface) of the tank rather than being suspended in the filtered waste water as the grit might if the velocity-diffusing baffle was not present to reduce that flow velocity. Grit passes through the flow screen, then through the velocity-diffusing baffle, and into the tank to produce a grit slurry in a bottom portion of the tank. The velocity-diffusing baffle directs the grit downward toward the bottom portion of the tank where it settles to form a grit slurry.

An overflow weir is installed at or below a water line around an interior perimeter of an interior surface of a side wall of the tank. The overflow weir forms a channel inside the tank at or near the water line. As filtered waste water that passed through the flow screen and velocity-diffusing baffle into the tank crests or otherwise flows over the overflow weir, the filtered waste water passes out of the system through an outlet that communicates with the tank at the channel of the overflow weir.

A pump (e.g., a water pump or an airlift pump) removes the grit slurry from the tank to a dewatering device, and the dewatering device removes water from the grit slurry to produce dewatered grit. The dewatered grit is transmitted from the dewatering device to a grit classifier, and the grit classifier ejects the dewatered grit out of the waste water treatment system.

The waste water treatment systems and methods described herein provide an advantage because the systems described herein have a more compact footprint when installed on a floor or ground so as to occupy less area. The waste water treatment systems and methods described herein provide another advantage because the tank includes a single inlet and single outlet so that expensive and time consuming concrete forming is unnecessary. The waste water treatment systems and methods described herein provide still another advantage because they are more efficient in removing screenings, grit, sediment, and other debris from waste water during waste water treatment. The waste water treatment systems and methods described herein also provide an advantage because they permit continued operation while flow screens are undergoing maintenance, repair, or replacement.

Accordingly, the invention features a waste water treatment system for removing grit, objects, and screenings from waste water. The system includes an inlet plenum for receiving unfiltered waste water, a tank, a flow screen, an overflow weir, a velocity-diffusing baffle, a washing compactor, a pump, a dewatering device, a grit classifier, and an outlet. The tank receives filtered waste water and includes a top portion and a lower portion, wherein the top portion is wider than the lower portion. The flow screen is installed in or above the tank to capture screened material present in the unfiltered waste water received from the inlet plenum. Filtered waste water passes through the flow screen. The screened material includes one or more screenings larger than openings of the flow screen, which are captured by the flow screen. Suspended material that is smaller than the openings of the flow screen passes through the flow screen and is discharged to a center of the tank. The suspended material includes grit and objects. The overflow weir includes a top portion installed at or below a water line around an interior perimeter of the tank. Objects smaller than openings of the flow screen pass over the top portion of the overflow weir. The velocity-diffusing baffle is installed in the tank around a bottom portion of the flow screen. The velocity-diffusing baffle includes one or more walls defining a top opening, a bottom opening, and an interior passage between the top and bottom openings. The velocity-diffusing baffle and the bottom portion of the flow screen are submerged below the water line in the tank. Filtered waste water and grit pass through the flow screen, through the interior passage of the velocity-diffusing baffle, and out of the bottom opening of the velocity-diffusing baffle into the bottom portion of the tank to settle as a grit slurry. The washing compactor ejects the screened material out of the waste water treatment system, wherein the screened material is received from the flow screen. The pump removes the grit slurry from the tank. The dewatering device removes water from the grit slurry received from the tank to produce dewatered grit, and the pump moves the grit slurry from the tank to the dewatering device. The grit classifier ejects the dewatered grit out of the waste water treatment system. The outlet transmits filtered waste water and the objects out of the tank when the filtered waste water flows over the overflow weir.

In another aspect, the invention can feature the flow screen being or including a center flow screen that is centrally disposed so as to be above or at least partially submerged in a center of the tank to diffuse a velocity of filtered waste water flowing out of the center flow screen into the tank.

In another aspect, the invention can feature the tank being circular in horizontal cross-section.

In another aspect, the invention can feature the bottom portion of the tank being or including an inverted cone in shape to divert grit passing out of the velocity-diffusing baffle downward to an interior bottom end of the tank.

In another aspect, the invention can feature the tank being rectangular in horizontal cross-section.

In another aspect, the invention can feature the bottom portion of the tank being or including an inverted pyramid in shape to divert grit passing out of the velocity-diffusing baffle downward to an interior bottom end of the tank.

In another aspect, the invention can feature the velocity-diffusing baffle including a cylindrical wall having a top end and bottom end and defining an interior space. The cylindrical wall includes one or more points of attachment for connecting the cylindrical wall to one or more support elements disposed near or within the tank. The top end of the cylindrical wall is disposed above a water line within the tank and the bottom end of the cylindrical wall is submerged in the water within the tank.

In another aspect, the invention can feature the inlet plenum being or including a duct having at least one wall that defines an interior space, a first open end, and a second end. The interior space of the duct communicates with the first open end and the second open end. The first end of the duct receives unfiltered waste water. The second end of the duct transports the unfiltered waste water into the flow screen of the waste water treatment system.

The invention also features a waste water treatment system for removing grit, objects, and screenings from waste water, the system including an inlet plenum for receiving unfiltered waste water, a grit settling tank, a center flow screen, an overflow weir, a velocity-diffusing baffle, a washing compactor, a pump, a dewatering device, a grit classifier, and an outlet. The grit settling tank receives filtered waste water and includes a top portion and a lower portion, wherein the top portion is wider than the lower portion. The center flow screen is installed so as to be above or at least partially submerged in a center of the grit settling tank to capture screened material present in the unfiltered waste water received from the inlet plenum. Filtered waste water passes through the center flow screen. The center flow screen's centered position relative to a center of the grit settling tank diffuses a velocity of filtered waste water flowing out of the flow screen into the grit settling tank. The screened material includes one or more screenings larger than openings of the flow screen, which are captured by the flow screen. Suspended material that is smaller than the openings of the flow screen passes through the flow screen and is discharged to a center of the tank. The suspended material includes grit and objects. The overflow weir includes a top portion installed at or below a water line around an interior perimeter of the grit settling tank, wherein objects smaller than openings of the center flow screen pass over the top portion of the overflow weir. The velocity-diffusing baffle is installed in the grit settling tank around a bottom portion of the center flow screen. The velocity-diffusing baffle and the bottom portion of the center flow screen are submerged below the water line in the grit settling tank. Filtered waste water and grit pass through the center flow screen, through an interior passage of the velocity-diffusing baffle, and into the bottom portion of the grit settling tank to settle as a grit slurry. The washing compactor ejects the screened material out of the waste water treatment system. The pump removes the grit slurry from the grit settling tank. The dewatering device removes water from the grit slurry received from the grit settling tank to produce dewatered grit, and the pump moves the grit slurry from the grit settling tank to the dewatering device. The grit classifier ejects the dewatered grit out of the waste water treatment system. The outlet transmits filtered waste water and the objects out of the grit settling tank when the filtered waste water flows over the overflow weir.

In another aspect, the invention can feature the grit settling tank being circular in horizontal cross-section and the bottom portion of the grit settling tank being or including an inverted cone in shape to divert grit passing out of the velocity-diffusing baffle downward to an interior bottom end of the grit settling tank.

In another aspect, the invention can feature the grit settling tank being rectangular in horizontal cross-section and the bottom portion of the grit settling tank being or including an inverted pyramid in shape to divert grit passing out of the velocity-diffusing baffle downward to an interior bottom end of the grit settling tank.

In another aspect, the invention can feature the velocity-diffusing baffle including a cylindrical wall having a top end and bottom end and defining an interior space. The cylindrical wall includes one or more points of attachment for connecting the cylindrical wall to one or more support elements disposed near or within the tank. The top end of the cylindrical wall is disposed above a water line within the tank and the bottom end of the cylindrical wall is submerged in the water within the tank.

In another aspect, the invention can feature the inlet plenum is or includes a duct having at least one wall that defines an interior space within the duct, a first open end, and a second end. The interior space of the duct communicates with the first open end and the second open end. The first end of the duct receives unfiltered waste water. The second end of the duct transports the unfiltered waste water into the flow screen of the waste water treatment system.

A method of the invention can be used for removing grit, objects, and screenings from waste water, the method including the steps of: (a) receiving unfiltered waste water into a flow screen of a waster water treatment system, the system including a tank, the flow screen, an overflow weir, a velocity-diffusing baffle, a washing compactor, a pump, a dewatering device, a grit classifier, and an outlet; (b) using the flow screen, capturing screened material present in the unfiltered waste water received in the system; wherein the flow screen is installed in or above the tank; wherein filtered waste water passes through the flow screen; wherein the screened material is or includes one or more screenings larger than openings of the flow screen, which are captured by the flow screen; wherein suspended material that is smaller than the openings of the flow screen passes through the flow screen and is discharged to a center of the tank; and wherein the suspended material is or includes grit and objects; (c) removing the objects, which are smaller than openings of the flow screen, from filtered waste water using an overflow weir having a top portion installed at or below a water line around an interior perimeter of the tank, wherein the objects pass over the top portion of the overflow weir and are transmitted out of the waste water treatment system through an outlet; and (d) diverting grit in filtered waste water to settle at an interior bottom end of the tank using a velocity-diffusing baffle installed in the tank around a bottom portion of the flow screen; wherein the velocity-diffusing baffle and the bottom portion of the flow screen are submerged below the water line in the tank; and wherein filtered waste water and grit pass through the flow screen, through an interior passage of the velocity-diffusing baffle, and downward to the interior bottom end of the tank to settle as a grit slurry.

Another method of the invention can feature the flow screen being or including a center flow screen that is centrally disposed above or at least partially submerged in a center of the tank to diffuse a velocity of filtered waste water flowing out of the center flow screen into the tank.

Another method of the invention can include the step of: (e) ejecting the screened material out of the waste water treatment system using a washing compactor.

Another method of the invention can include the steps of: (f) removing the grit slurry from the tank using a pump; (g) removing water from the grit slurry received from the tank using a dewatering device to produce dewatered grit; wherein a pump moves the grit slurry from the tank to the dewatering device; and (h) ejecting the dewatered grit out of the waste water treatment system using a grit classifier.

Another method of the invention can feature the tank being circular in horizontal cross-section and a bottom portion of the tank being or including an inverted cone in shape to divert grit passing out of the velocity-diffusing baffle downward to the interior bottom end of the tank.

Another method of the invention can feature the tank being rectangular in horizontal cross-section and the bottom portion of the tank being or including an inverted pyramid in shape to divert grit passing out of the velocity-diffusing baffle downward to the interior bottom end of the tank.

The invention also features a velocity-diffusing baffle for installation in a tank of a waste water treatment system to direct grit in waste water to a bottom of the tank. The velocity-diffusing baffle includes a cylindrical wall having a top end and bottom end and defining an interior space. The cylindrical wall includes one or more points of attachment for connecting the cylindrical wall to one or more support elements disposed near or within the tank of the waste water treatment system. The top end of the cylindrical wall is disposed above a water line within the tank and the bottom end of the cylindrical wall is submerged in the water within the tank.

The invention also features an inlet plenum for receiving unfiltered waste water into a flow screen of a waste water treatment system. The inlet plenum is or includes a duct having at least one wall that defines an interior space within the duct, a first open end, and a second end. The interior space of the duct communicates with the first open end and the second open end. The first end of the duct receives unfiltered waste water, and the second end of the duct transports the unfiltered waste water into the flow screen of the waste water treatment system.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

Figure 1:
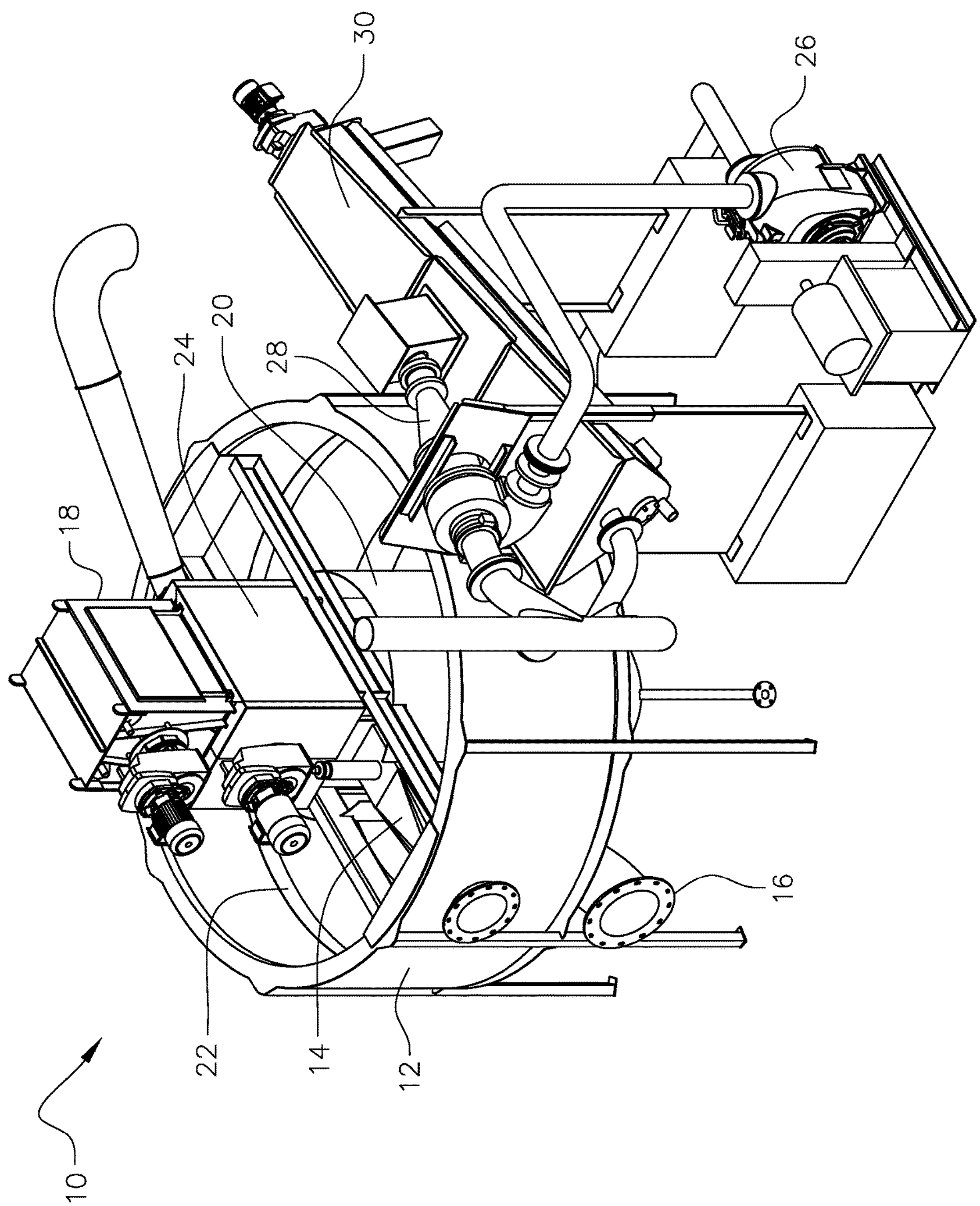
FIG. 1 is a perspective view of a waste water treatment system.
Figure 2:
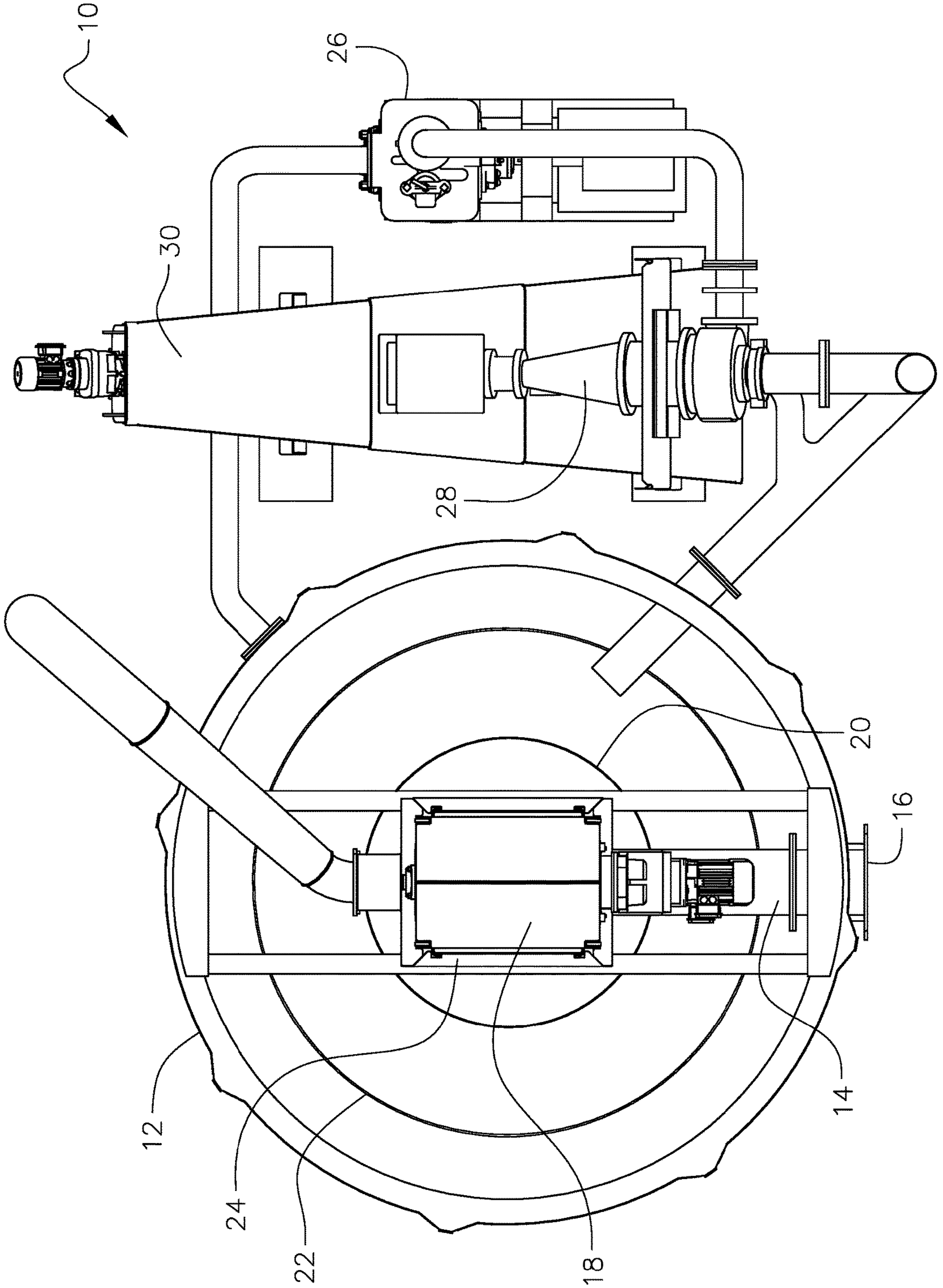
FIG. 2 is a top plan view of the waste water treatment system of FIG. 1.
Figure 3:
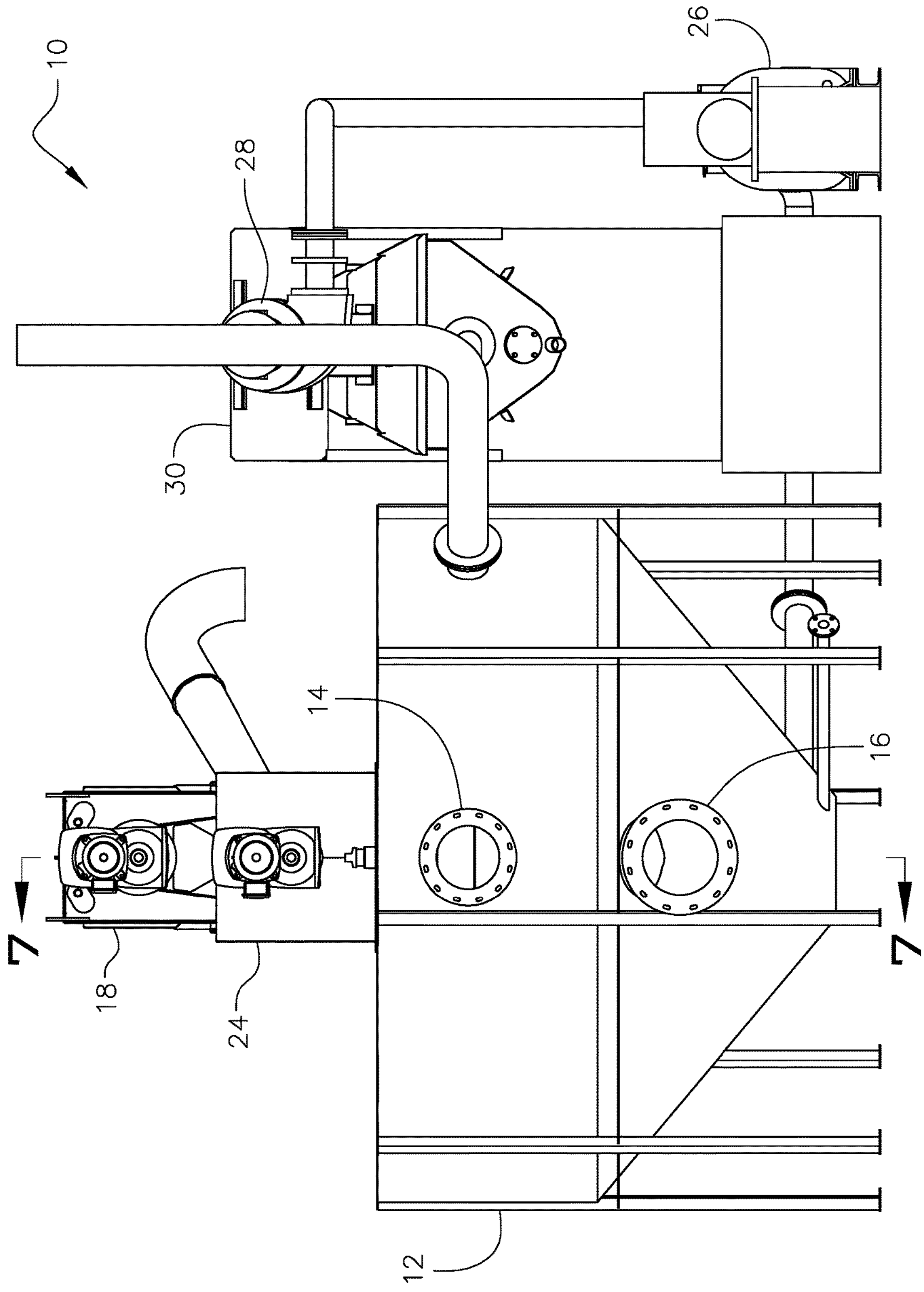
FIG. 3 is a front elevation view of the waste water treatment system of FIG. 1.
Figure 4:
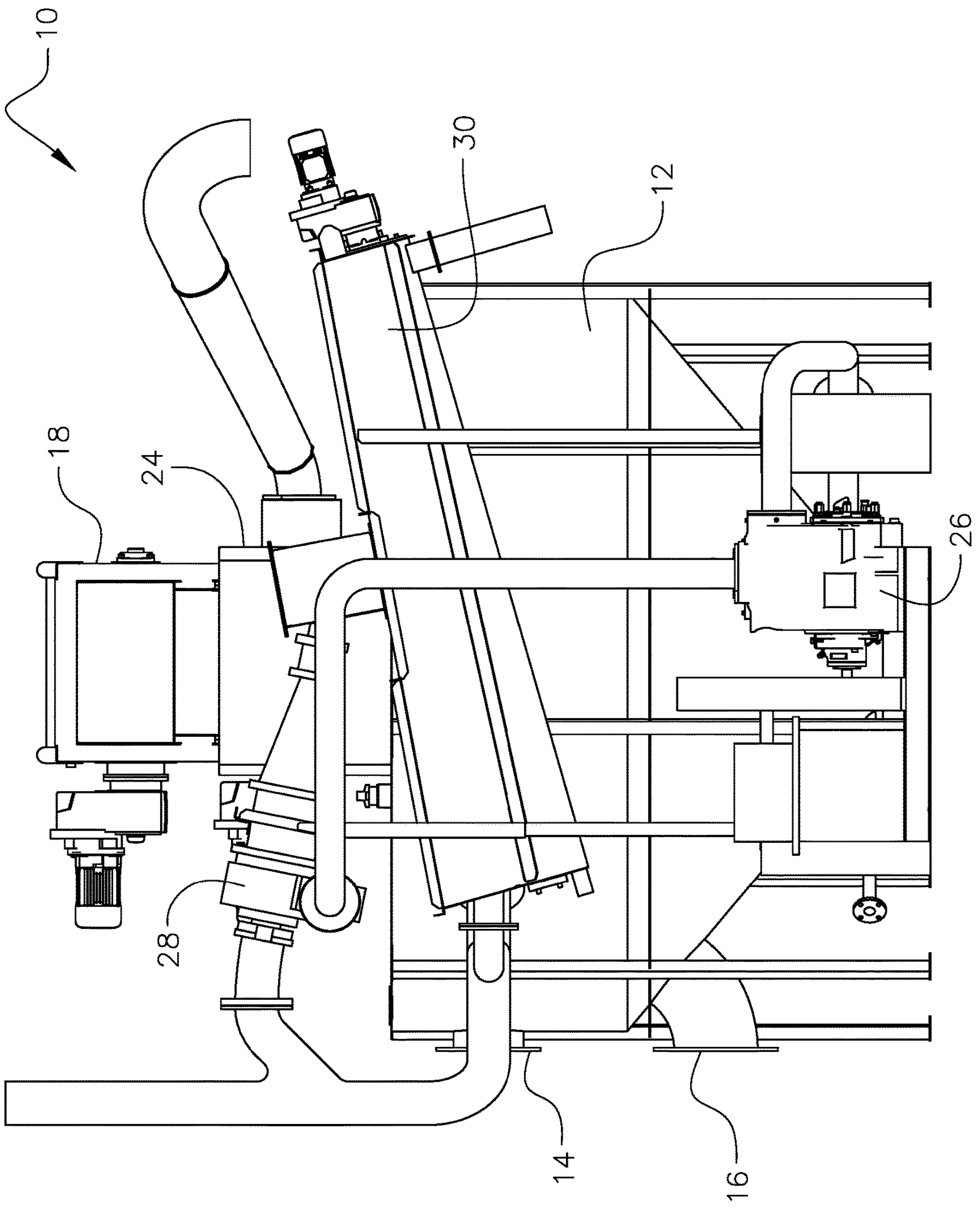
FIG. 4 is a right side elevation view of the waste water treatment system of FIG. 1.
Figure 5:
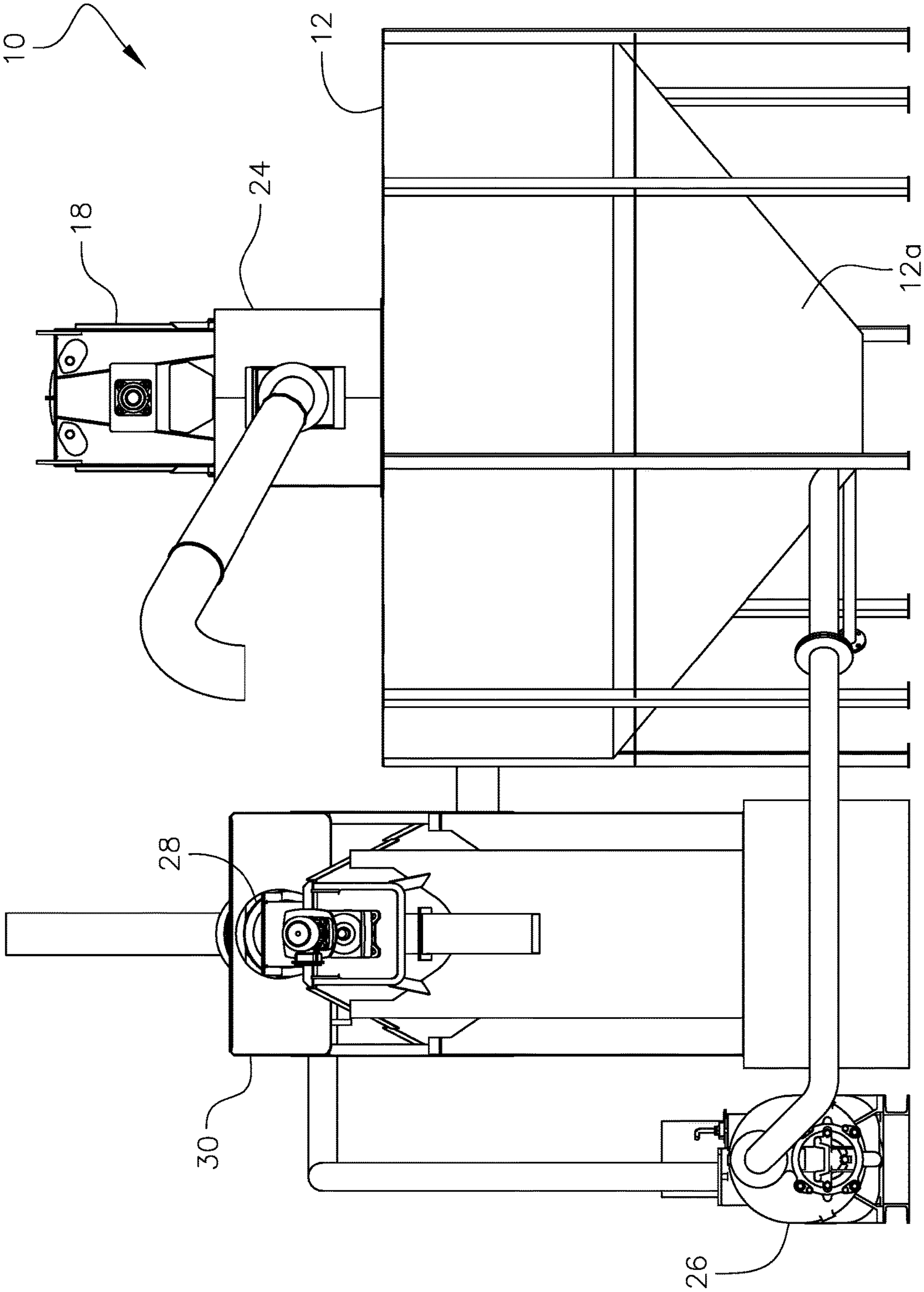
FIG. 5 is a rear elevation view of the waste water treatment system of FIG. 1.
Figure 6:
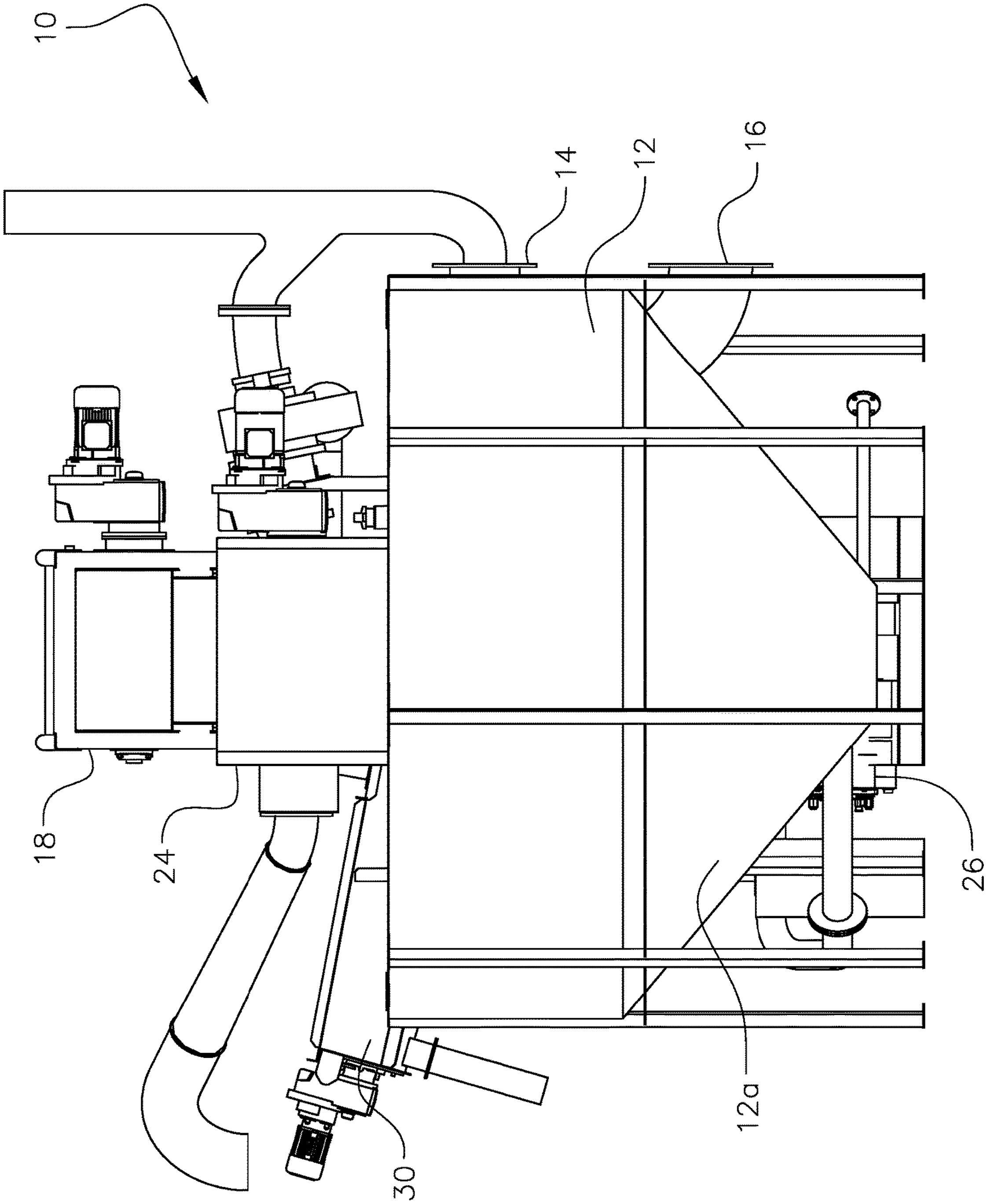
FIG. 6 is a left side elevation view of the waste water treatment system of FIG. 1.
Figure 7:
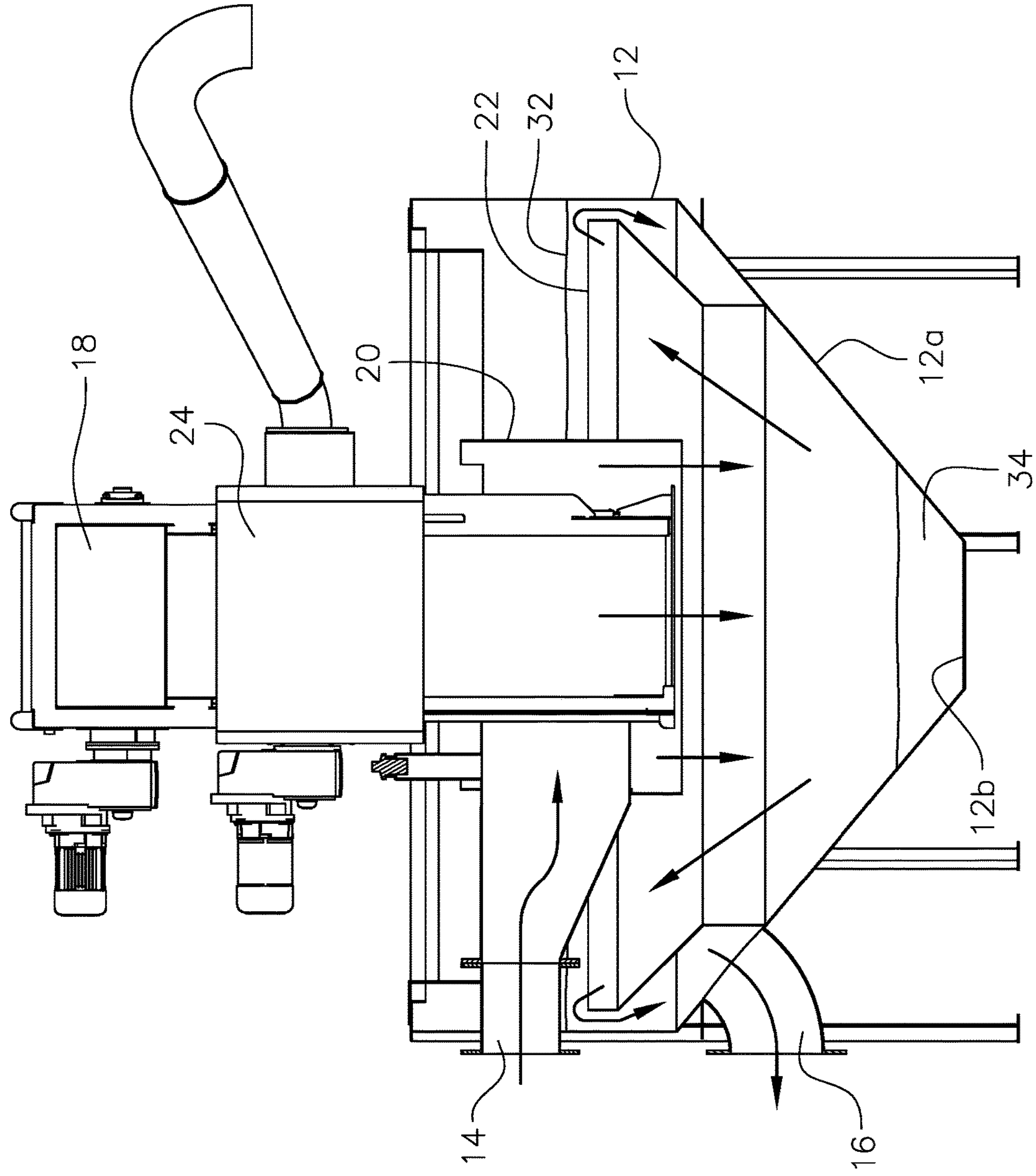
FIG. 7 is a cut-away view of a tank of the waste water treatment system of FIG. 1, with arrows indicating flow of waste water through the system.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The invention provides a waste water treatment system 10 that use screening and other means to remove screenings and grit from waste water. The terms "grit" and "grit particles," as used herein, include sand, small rocks, sediment, and other debris (generally, particulates) of a size that is small enough to pass through openings of one or more flow screens of the system. Floating objects and suspended materials that are small enough to pass through openings of one or more flow screens of the system may be referred to herein as "objects." The term "screened material" and the term "screenings," when used as a noun herein, mean sand, small rocks, sediment, paper, plastics, metals, cloth, and other debris and objects of a size large enough to be captured by the one or more flow screens of the system to prevent clogging and damage of components and piping that are downstream from the one or more flow screens. In an exemplary embodiment as shown in FIGS. 1-8, the waste water treatment system 10 includes a tank 12, an inlet plenum 14, an outlet 16, a flow screen 18, a velocity-diffusing baffle 20, an overflow weir 22, a washing compactor 24, a pump 26, a dewatering device 28, and a grit classifier 30.

Tanks 12 that are used with this system are also referred to as grit settling tanks or clarifiers. The tank 12, which serves as a grit settling tank 12, can be of any shape, but in exemplary embodiments, the tank is generally cylindrical with a conical bottom portion. The tank 12 is constructed from concrete, plastic, stainless steel, aluminum, or another metal, semi-metal, or manufactured material. The tank 12 includes at least one wall having an interior surface and an exterior surface. The wall of the conical bottom portion of the tank 12 is shaped so that grit falls down its interior surface to collect as a grit slurry 34 at an interior bottom end **12*b* (also referred to herein as a bottom or as an interior bottom surface) of the tank. The grit slurry is a mixture of grit and water. A top of the tank 12** may be open or covered with a removable cover.

In one exemplary embodiment, the tank 12 is circular in horizontal cross-section and includes a top portion and a bottom portion **12*a*. The bottom portion 12*a* of the tank 12** is an inverted cone in shape to divert grit passing out of the velocity-diffusing baffle downward to an interior bottom end 12*b* of the grit settling tank.

In another exemplary embodiment, the tank 12 is rectangular in horizontal cross-section and includes a top portion and a bottom portion 12*a*. The bottom portion 12*a* of the grit settling tank is an inverted pyramid in shape to divert grit passing out of the velocity-diffusing baffle downward to an interior bottom end of the grit settling tank.

The inlet receives unfiltered waste water. The inlet includes an inlet flange. In exemplary embodiments, the inlet can also include an inlet plenum 14 that receives a flow of the unfiltered waste water and diffuses that flow before distributing it into and through the flow screen 18. The inlet plenum 14 decreases flow velocity of the unfiltered waste water and diffuses that flow into the flow screen 18. The inlet plenum 14 connects the inlet to the flow screen 18. The inlet plenum 14 may be an entirely enclosed duct meaning one or more walls that enclose an interior space or channel for carrying waste water into the flow screen 18. However, in other embodiments, the inlet plenum 14 may not be entire enclosed but may have one or more openings in its wall, or it may be shaped as a trough with an open top side. The inlet and its inlet plenum 14 are generally installed near the top of the tank 12. The inlet and inlet plenum 14 may also be installed above, at, or below a water line 32 inside the tank 12. The water line 32 is a height or level inside the tank 12 at which the waste water within the tank is not intended to exceed. To remove filtered waste water from the tank 12 and to prevent the filtered waste water inside the tank from rising higher than the water line 32, the tank includes an overflow weir 22 for capturing filtered waste water that flows over the overflow weir and into a channel within the overflow weir, thereby directing such filtered waste water out of the tank through the outlet 16. The outlet 16 can be referred to as a system outlet or an effluent outlet. The overflow weir 22 is installed around an entire perimeter of the interior surface of the wall at a height within the tank 12 at or just above the desired water line 32. For example, in embodiments in which the tank 12 is cylindrical in shape, the overflow weir 22 may be installed radially around the entire or part of a perimeter of the interior surface of the wall of the tank. As mentioned above, the overflow weir 22 forms a channel into which water inside the tank flows into at or near the water line. The channel of the overflow weir 22 drains the filtered waste water through the outlet 16 and out of the tank 12.

As mentioned above and as shown in FIG. 8, rather than being a trough open on one side as in other systems, the inlet plenum 14 of the system 10 can be an entirely closed duct through which unfiltered waste water is transmitted to the flow screen for filtering. The inlet plenum 14 is useful for slowing down the velocity of unfiltered waste water flowing into the flow screen by serving to even out the flow velocity entering the flow screen in order to reduce headloss through the system 10 as well as to reduce high-velocity areas of flow of waste water entering into the flow screen 18 that would create uneven loading to the flow screen's grid and potentially bypass screening.

In exemplary embodiments, a velocity-diffusing baffle 20 is installed inside the tank 12 to direct grit that is not filtered and captured by the flow screen into the bottom portion 12*a* of the tank where it settles at the interior bottom surface 12*b* and becomes part of the grit slurry 34. The velocity-diffusing baffle 20 includes a top end 20*a*, a bottom end 20*b*, and at least one side wall 20*c* defining an interior space connecting top and bottom openings. The top end 20*a* of the velocity-diffusing baffle 20 may be open or closed and is installed inside the tank 12 so that its wall 20*c* surrounds an area beneath the flow screen 18 (although a portion of the side wall 20*c* may extend to a height above the bottom end of the flow screen. The bottom end 20*b* of the velocity-diffusing baffle 20 is open so that water and grit not captured by the flow screen 18 pass through the velocity-diffusing baffle and into the tank 12. In exemplary embodiments, the wall 20*c* of the velocity-diffusing baffle 20 is circular in horizontal cross-section, although it may other shapes (e.g., rectangular) in other embodiments. By directing flow of waste water out of the flow screen 18 and downward through the top opening of the velocity-diffusing baffle 20 and out of its bottom opening, velocity of the flow of waste water through the system 10 is further reduced. As the flow of unfiltered waste water passes through the flow screen 18 and is directed by the velocity-diffusing baffle 20 downward toward the bottom portion 12*b* of the tank 12, grit particles settle to the bottom portion of the tank for removal, while filtered waste water that has been degritted (i.e., had its grit removed) exits the tank after cresting the overflow weir 22. When unfiltered waste water passes through the flow screen 18, it passes through a first side of the flow screen and out of a second side of the flow screen (e.g., radially) to eventually pass over the overflow weir 22. The filtered waste water that flows over the overflow weir 22 and out of the outlet 16 is collected for piping out of the waste water treatment system 10. The outlet 16 may include an outlet flange.

The velocity-diffusing baffle 20 is important to dissipate or reduce the velocity of the filtered waste water flowing out of the flow screen 18. The velocity-diffusing baffle 20 serves to diffuse or reduce the velocity of filtered waste water and grit contained in the filtered waste water exiting the flow screen 18 so that the grit is directed radially downward toward the bottom of the tank 12 to settle in or on an interior bottom end 12*b* (also referred to as an interior bottom surface) of the tank rather than being suspended in the filtered waste water as the grit might if the velocity-diffusing baffle was not present. The velocity-diffusing baffle 20 reduces that flow velocity and prevents the grit from exiting straight out through the flow screen's grid near the top of the tank 12 and passing over the overflow weir 22. By reducing flow velocity of filtered waste water and grit exiting the flow screen 18, the velocity-diffusing baffle 20 increases the time the solids (i.e., the grit) are in the tank 12 to allow them to settle to the interior bottom end of the tank for collection and removal. Without the velocity-diffusing baffle 20, the effectiveness of the system 10 at capturing grit and other similarly small and slower settling solids in the filtered waste water within the tank 12 would be reduced. The velocity-diffusing baffle 20 allows a smaller tank to be used for settling grit and other similarly small and slower settling solids in the filtered waste water, whereas without the velocity-diffusing baffle, a much larger tank might be required to allow grit and other slower settling solids sufficient space and time to settle to the bottom.

The flow screen 18 is installed in or above the tank 12 to capture screenings. In some embodiments, the flow screen 18 is a center flow screen that is disposed or installed centrally at or near a central longitudinal axis (also referred to herein as a center) of the tank 12 and is at least partially submerged in the water (meaning below the water line 32) inside the tank. The screenings are objects of any size greater than a diameter of openings or a spacing between grid elements through the flow screen 18, which are sized so as to capture screenings while allowing filtered waste water and grit to pass through. The flow screen 18 includes one or more grids or meshes. Flow screens 18 of varying mesh sizes may be utilized, and in some embodiments, flow screens having different mesh sizes may be interchangeable in the system depending on the size of screenings desired to be filtered from the unfiltered waste water. In exemplary embodiments, the flow screen 18 is installed centrally at the top of the tank 12 so that the filter is suspended above a center of the tank. A portion of the flow screen 18 extends into the tank 12 below the water line 32 so that the flow screen is partially submerged at a bottom end of the flow screen. Unfiltered water is directed from the inlet plenum 14 through the flow screen 18, and the flow screen filters screenings from the unfiltered waste water to produce filtered waste water. Grit that is smaller than the openings of the flow screen 18 passes through those openings along with filtered waste water.

In some embodiments, the flow screen 18 is connected to the washing compactor 24 that ejects the screenings out of the system 10. The washing compactor 24 is installed in or above the tank 12 in connection with the flow screen 18. For example, the washing compactor 24 may be positioned beneath or adjacent to the flow screen 18. The washing compactor 24 ejects the screenings out of a compactor discharge. The waste water treatment system 10 may include a bin or other container for receiving the screenings ejected by the washing compactor 24.

The pump 26 of the system 10 removes the grit slurry 34 from the tank 12 for further processing by the system. The pump 26 may be a water pump or an airlift pump. The pump 26 is connected by piping (e.g., a vacuum pipe) to the tank 12 at a grit slurry outlet through which the pump draws the grit slurry 34 out of the bottom portion 12*b* of the tank and transmits the grit slurry to the dewatering device 28. The pump 26 forces the grit slurry 34, including water, through piping of the system 10 that connects the tank 12 to the pump and the pump to the dewatering device 28.

The system 10 may also include a fluid injection pipe connected at a first end to a fluid injection system or device (also known as a fluidizer) and at a second end through the wall of the tank at or near the interior bottom surface of the tank. The fluid injection system or device injects water, air, or another liquid or gas through the fluid injection pipe into the interior bottom surface of the tank to break up the grit slurry to suspend it in the filtered waste water in the interior bottom end of the tank so that the pump can more easily pump and remove the grit from the tank. In exemplary embodiments, the dewatering device 28 is a hydrocyclone, which is a separation device that receives grit slurry 34 from the pump 26 and spins to remove grit from the grit slurry while ejecting most water from the grit slurry. The water ejected from the dewatering device 28 is returned by piping to the tank 12 by the force of the pump 26. The dewatering device 28 removes water from the grit slurry 34 to produce dewatered grit.

The dewatered grit is ejected from the dewatering device 28 into a grit classifier 30. The grit classifier 30 includes an internal chamber in which a screw augur turns to carry dewatered grit out of an ejection port or discharge of the grit classifier. The grit classifier 30 ejects the dewatered grit out of the waste water treatment system 10, e.g., into the previously mentioned bin or other container or into a different bin or other container.

In the event that the flow screen 18 is out of service for maintenance, repair, or replacement, the waste water treatment system 10 is capable of routing unfiltered waste water around the flow screen to bypass the flow screen.

Figure 8:
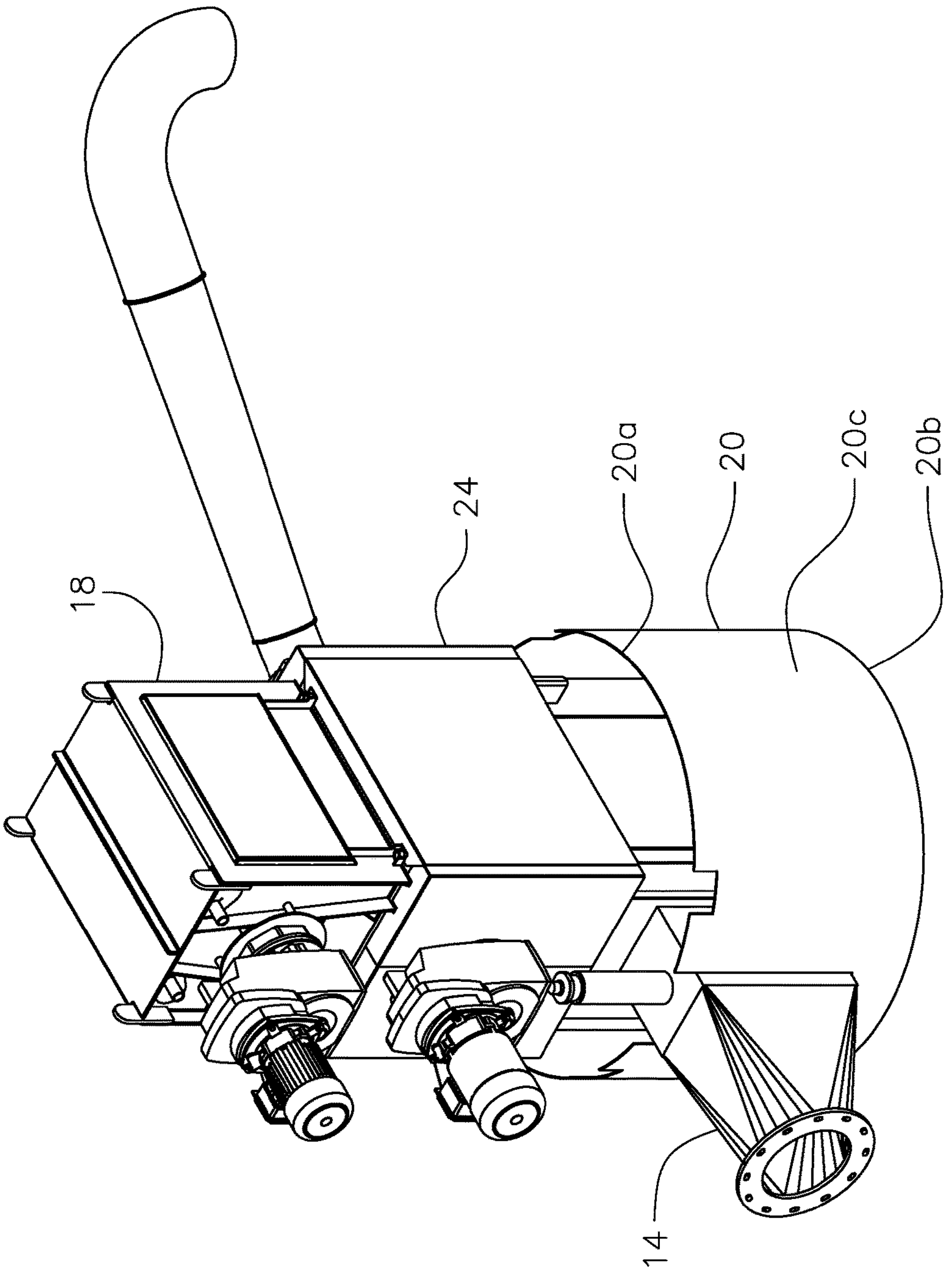
FIG. 8 is a perspective view of a velocity-diffusing baffle and an inlet plenum connected to a flow screen of the waste water treatment system of FIG. 1.
Figure 9A:
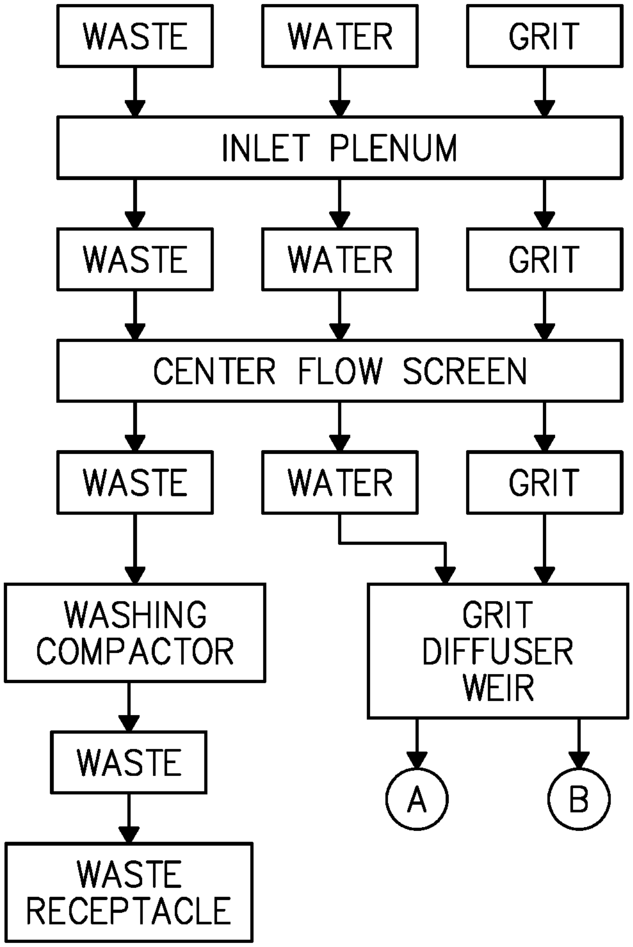
FIGS. 9A and 9B are a flowchart showing movement of waste water and waste such as objects and screenings, and grit present in the waste water through the waste water treatment system of FIG. 1.
Figure 9B:
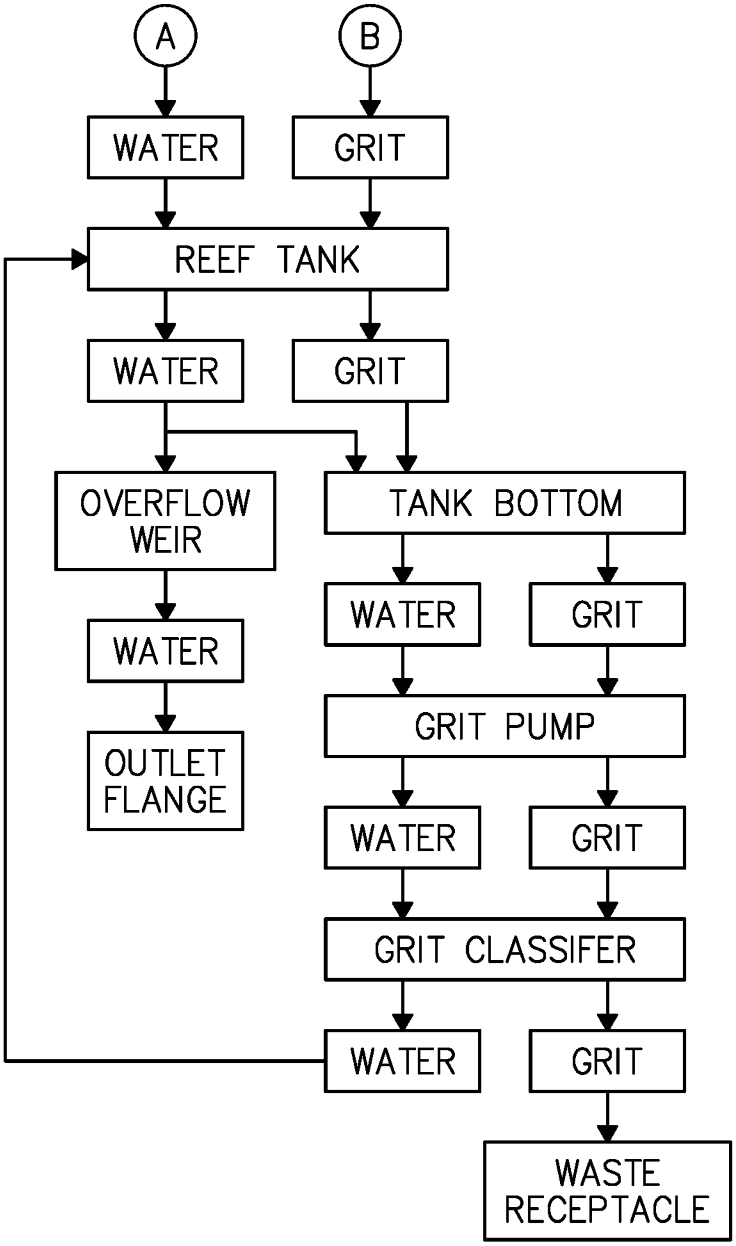

FIG. 8 includes arrows to indicate the flow of waste water, grit, objects, and screenings through the waste water treatment system 10. FIGS. 9A and 9B provide a flowchart showing movement of waste such as objects and screenings, grit, and waste water through the waste water treatment system 10.

The invention also features methods that can be used for removing grit, objects, and screenings from waste water using devices and systems described elsewhere herein. In one exemplary embodiment of a method for removing grit, objects, and screenings from waste water, the method includes the step of receiving unfiltered waste water into a flow screen of a waste water treatment system. The system includes the tank, an inlet plenum, a flow screen, an overflow weir, a velocity-diffusing baffle, a washing compactor, a pump, a dewatering device, a grit classifier, and an outlet, although in some embodiments, the system may not include one or more of the inlet plenum, the overflow weir, the velocity-diffusing baffle, the washing compactor, the pump, the dewatering device, or the grit classifier. In a next step of the method, using the flow screen, screened material present in the unfiltered waste water received in the flow screen is captured. The flow screen is installed in or above the tank. Filtered waste water passes through the flow screen, and the screened material that is or includes one or more screenings larger than openings of the flow screen is captured by the flow screen. Suspended material that is smaller than the openings of the flow screen passes through the flow screen and is discharged to a center of the tank. The suspended material is or includes grit and objects. In a next step of the method, the objects, which are smaller than openings of the flow screen, are removed from filtered waste water using an overflow weir having a top portion installed at or below a water line around an interior perimeter of the tank. The overflow weir facilitates separation of water and objects small enough to pass through the flow screen. Screened water passes over the overflow weir and is transmitted out of the wastewater treatment system. In a next step of the method, grit in filtered waste water is diverted to settle at an interior bottom end of the tank using a velocity-diffusing baffle installed in the tank around a bottom portion of the flow screen. The velocity-diffusing baffle and the bottom portion of the flow screen are submerged below the water line in the tank. Filtered waste water and grit pass through the flow screen, through an interior passage of the velocity-diffusing baffle, and downward to the interior bottom end of the tank to settle as a grit slurry.

In exemplary embodiments of the methods of this invention, the flow screen can be or can include a center flow screen that is centrally disposed above or at least partially submerged in a center of the tank to diffuse a velocity of filtered waste water flowing out of the center flow screen into the tank.

In some embodiments, the method can also include the step of ejecting the screened material out of the waste water treatment system using a washing compactor.

In some embodiments, the method can also include the step of removing the grit slurry from the tank using a pump. In some embodiments, the method can also include the step of removing water from the grit slurry received from the tank using a dewatering device to produce dewatered grit, wherein a pump moves the grit slurry from the tank to the dewatering device. In some embodiments, the method can also include the step of ejecting the dewatered grit out of the waste water treatment system using a grit classifier.

In exemplary embodiments of the methods of this invention, the tank can be circular in horizontal cross-section and a bottom portion of the tank can be or can include an inverted cone (e.g., inverted (or upside down) and conical in shape) to divert grit passing out of the velocity-diffusing baffle downward to the interior bottom end of the tank.

In other exemplary embodiments of the methods of this invention, the tank can be rectangular in horizontal cross-section and the bottom portion of the tank can be or can include an inverted pyramid (e.g., inverted (or upside down) and pyramidal in shape) to divert grit passing out of the velocity-diffusing baffle downward to the interior bottom end of the tank.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A waste water treatment system for removing grit, objects, and screenings from waste water, the system comprising:

- an inlet plenum for receiving unfiltered waste water;
- a tank for receiving filtered waste water, wherein the tank comprises a top portion and a lower portion, wherein the top portion is wider than the lower portion;
- a flow screen installed in or above the tank to capture screened material present in the unfiltered waste water received from the inlet plenum; wherein filtered waste water passes through the flow screen; wherein the screened material comprises one or more screenings larger than openings of the flow screen, which are captured by the flow screen; wherein suspended material that is smaller than the openings of the flow screen passes through the flow screen and is discharged to a center of the tank; and wherein the suspended material comprises grit and objects;
- an overflow weir comprising a top portion installed at or below a water line around an interior perimeter of the tank, wherein filtered waste water and objects smaller than openings of the flow screen pass over the top portion of the overflow weir;
- a velocity-diffusing baffle installed in the tank around a bottom portion of the flow screen; wherein the velocity-diffusing baffle comprises one or more walls defining a top opening, a bottom opening, and an interior passage between the top and bottom openings; wherein the velocity-diffusing baffle and the bottom portion of the flow screen are submerged below the water line in the tank; and wherein filtered waste water and grit pass through the flow screen, through the interior passage of the velocity-diffusing baffle, and out of the bottom opening of the velocity-diffusing baffle into the bottom portion of the tank to settle as a grit slurry;
- a washing compactor for ejecting the screened material out of the waste water treatment system, wherein the screened material is received from the flow screen;
- a pump for removing the grit slurry from the tank;
- a dewatering device for removing water from the grit slurry received from the tank to produce dewatered grit; wherein the pump moves the grit slurry from the tank to the dewatering device;
- a grit classifier for ejecting the dewatered grit out of the waste water treatment system; and
- an outlet for transmitting filtered waste water and the objects out of the tank when the filtered waste water flows over the overflow weir.

2. The waste water treatment system of claim 1, wherein the flow screen comprises a center flow screen that is centrally disposed so as to be above or at least partially submerged in a center of the tank to diffuse a velocity of filtered waste water flowing out of the center flow screen into the tank.

3. The waste water treatment system of claim 1, wherein the tank is circular in horizontal cross-section.

4. The waste water treatment system of claim 3, wherein the bottom portion of the tank comprises an inverted cone in shape to divert grit passing out of the velocity-diffusing baffle downward to an interior bottom end of the tank.

5. The waste water treatment system of claim 1, wherein the tank is rectangular in horizontal cross-section.

6. The waste water treatment system of claim 5, wherein the bottom portion of the tank comprises an inverted pyramid in shape to divert grit passing out of the velocity-diffusing baffle downward to an interior bottom end of the tank.

7. The waste water treatment system of claim 1, wherein the velocity-diffusing baffle comprises a cylindrical wall comprising a top end and a bottom end and defining an interior space;

- wherein the cylindrical wall comprises one or more points of attachment for connecting the cylindrical wall to one or more support elements disposed near or within the tank; and
- wherein the top end of the cylindrical wall is disposed above a water line within the tank and the bottom end of the cylindrical wall is submerged in the water within the tank.

8. The waste water treatment system of claim 1, wherein the inlet plenum comprises a duct comprising at least one wall that defines an interior space, a first open end, and a second open end;

- wherein the interior space of the duct communicates with the first open end and the second open end;
- wherein the first open end of the duct receives unfiltered waste water;
- wherein the second open end of the duct transports the unfiltered waste water into the flow screen of the waste water treatment system.

9. A waste water treatment system for removing grit, objects, and screenings from waste water, the system comprising:

- an inlet plenum for receiving unfiltered waste water;
- a grit settling tank for receiving filtered waste water, wherein the grit settling tank comprises a top portion and a lower portion, wherein the top portion is wider than the lower portion;
- a center flow screen installed so as to be above or at least partially submerged in a center of the grit settling tank to capture screened material present in the unfiltered waste water received from the inlet plenum; wherein filtered waste water passes through the center flow screen; wherein the center flow screen's centered position relative to a center of the grit settling tank diffuses a velocity of filtered waste water flowing out of the flow screen into the grit settling tank; wherein the screened material comprises one or more screenings larger than openings of the flow screen, which are captured by the flow screen; wherein suspended material that is smaller than the openings of the flow screen passes through the flow screen and is discharged to a center of the tank; and wherein the suspended material comprises grit and objects;

an overflow weir comprising a top portion installed at or below a water line around an interior perimeter of the grit settling tank, wherein filtered waste water and objects smaller than openings of the center flow screen pass over the top portion of the overflow weir;

a velocity-diffusing baffle installed in the grit settling tank around a bottom portion of the center flow screen; wherein the velocity-diffusing baffle and the bottom portion of the center flow screen are submerged below the water line in the grit settling tank; and wherein filtered waste water and grit pass through the center flow screen, through an interior passage of the velocity-diffusing baffle, and into the bottom portion of the grit settling tank to settle as a grit slurry;

a washing compactor for ejecting the screened material out of the waste water treatment system;

a pump for removing the grit slurry from the grit settling tank;

a dewatering device for removing water from the grit slurry received from the grit settling tank to produce dewatered grit; wherein the pump moves the grit slurry from the grit settling tank to the dewatering device;

a grit classifier for ejecting the dewatered grit out of the waste water treatment system; and an outlet for transmitting filtered waste water and the objects out of the grit settling tank when the filtered waste water flows over the overflow weir.

10. The waste water treatment system of claim 9, wherein the grit settling tank is circular in horizontal cross-section and the bottom portion of the grit settling tank comprises an inverted cone in shape to divert grit passing out of the velocity-diffusing baffle downward to an interior bottom end of the grit settling tank.

11. The waste water treatment system of claim 9, wherein the grit settling tank is rectangular in horizontal cross-section and the bottom portion of the grit settling tank comprises an inverted pyramid in shape to divert grit passing out of the velocity-diffusing baffle downward to an interior bottom end of the grit settling tank.

12. The waste water treatment system of claim 9, wherein the velocity-diffusing baffle comprises a cylindrical wall comprising a top end and a bottom end and defining an interior space;

wherein the cylindrical wall comprises one or more points of attachment for connecting the cylindrical wall to one or more support elements disposed near or within the tank; and wherein the top end of the cylindrical wall is disposed above a water line within the tank and the bottom end of the cylindrical wall is submerged in the water within the tank.

13. The waste water treatment system of claim 9, wherein the inlet plenum comprises a duct comprising at least one wall that defines an interior space within the duct, a first open end, and a second open end;

wherein the interior space of the duct communicates with the first open end and the second open end;

wherein the first open end of the duct receives unfiltered waste water;

wherein the second open end of the duct transports the unfiltered waste water into the flow screen of the waste water treatment system.

14. A method for removing grit, objects, and screenings from waste water by using the waste water treatment system recited in claim 1, the method comprising the steps of:

(a) receiving unfiltered waste water into a flow screen of a waster water treatment system, the waste water treatment system comprising a tank, the flow screen, an overflow weir, a velocity-diffusing baffle, a washing compactor, a pump, a dewatering device, a grit classifier, and an outlet;

(b) using the flow screen, capturing screened material present in the unfiltered waste water received in the flow screen; wherein the flow screen is installed in or above the tank; wherein filtered waste water passes through the flow screen; wherein the screened material comprises one or more screenings larger than openings of the flow screen, which are captured by the flow screen; wherein suspended material that is smaller than the openings of the flow screen passes through the flow screen and is discharged to a center of the tank; and wherein the suspended material comprises grit and objects;

(c) removing the objects, which are smaller than openings of the flow screen, from filtered waste water using an overflow weir comprising a top portion installed at or below a water line around an interior perimeter of the tank, wherein filtered waste water and the objects pass over the top portion of the overflow weir and are transmitted out of the waste water treatment system through an outlet; and (d) diverting grit in filtered waste water to settle at an interior bottom end of the tank using a velocity-diffusing baffle installed in the tank around a bottom portion of the flow screen; wherein the velocity-diffusing baffle and the bottom portion of the flow screen are submerged below the water line in the tank; and wherein filtered waste water and grit pass through the flow screen, through an interior passage of the velocity-diffusing baffle, and downward to the interior bottom end of the tank to settle as a grit slurry.

15. The method of claim 14, wherein the flow screen comprises a center flow screen that is centrally disposed above or at least partially submerged in a center of the tank to diffuse a velocity of filtered waste water flowing out of the center flow screen into the tank.

16. The method of claim 14, further comprising the step of:

(e) ejecting the screened material out of the waste water treatment system using a washing compactor.

17. The method of claim 14, further comprising the steps of:

(f) removing the grit slurry from the tank using a pump;

(g) removing water from the grit slurry received from the tank using a dewatering device to produce dewatered grit; wherein a pump moves the grit slurry from the tank to the dewatering device; and (h) ejecting the dewatered grit out of the waste water treatment system using a grit classifier.

18. The method of claim 14, wherein the tank is circular in horizontal cross-section and a bottom portion of the tank comprises an inverted cone in shape to divert grit passing out of the velocity-diffusing baffle downward to the interior bottom end of the tank.

19. The method of claim 14, wherein the tank is rectangular in horizontal cross-section and the bottom portion of the tank comprises an inverted pyramid in shape to divert grit passing out of the velocity-diffusing baffle downward to the interior bottom end of the tank.

* * * * *